United States Patent
Mohapatra

(10) Patent No.: US 11,443,737 B2
(45) Date of Patent: Sep. 13, 2022

(54) AUDIO VIDEO TRANSLATION INTO MULTIPLE LANGUAGES FOR RESPECTIVE LISTENERS

(71) Applicant: SONY CORPORATION, Tokyo (JP)

(72) Inventor: Bibhudendu Mohapatra, San Diego, CA (US)

(73) Assignee: Sony Corporation, Tokyo (JP)

( * ) Notice: Subject to any disclaimer, the term of this patent is extended or adjusted under 35 U.S.C. 154(b) by 93 days.

(21) Appl. No.: 16/742,513

(22) Filed: Jan. 14, 2020

(65) Prior Publication Data

US 2021/0217407 A1 Jul. 15, 2021

(51) Int. Cl.
| | |
|---|---|
| G06F 40/58 | (2020.01) |
| G10L 15/22 | (2006.01) |
| G10L 15/183 | (2013.01) |
| G10L 15/16 | (2006.01) |
| G06N 3/08 | (2006.01) |
| G10L 15/00 | (2013.01) |
| H04N 21/485 | (2011.01) |
| H04N 21/439 | (2011.01) |
| G10L 15/06 | (2013.01) |

(52) U.S. Cl.
CPC .............. *G10L 15/183* (2013.01); *G06N 3/08* (2013.01); *G10L 15/005* (2013.01); *G10L 15/063* (2013.01); *G10L 15/16* (2013.01); *G10L 15/22* (2013.01); *H04N 21/439* (2013.01); *H04N 21/4856* (2013.01)

(58) Field of Classification Search
None
See application file for complete search history.

(56) References Cited

U.S. PATENT DOCUMENTS

| | | | |
|---|---|---|---|
| 4,332,979 | A | 6/1982 | Fischer |
| 6,091,826 | A | 7/2000 | Laitinen et al. |
| 6,128,318 | A | 10/2000 | Sato |

(Continued)

FOREIGN PATENT DOCUMENTS

| | | |
|---|---|---|
| EP | 2346028 A1 | 7/2011 |
| JP | 2005080227 A | 3/2005 |
| WO | 2014184353 A1 | 11/2014 |

OTHER PUBLICATIONS

Montavon, Gregoire. "Deep learning for spoken language identification." NIPS Workshop on deep learning for speech recognition and related applications. 2009. (Year: 2009).*

(Continued)

*Primary Examiner* — Jialong He
(74) *Attorney, Agent, or Firm* — John L. Rogitz

(57) ABSTRACT

An audio source such as a display device configured to present AV content can present the video and send the audio in different languages to the respective devices of different listeners. For example, a device/TV/source can send audio in different languages to connected headphones/smartglasses with speakers/devices/sink. Furthermore, machine learning may be employed both to recognize listeners and correlate them to likely languages and to mimic voices in the played-back audio. Or, the source AV display device may send language in only the selected language of the display device to each listener device, with each receiving listener device converting the audio to the preferred language of the respective listener on the fly.

12 Claims, 5 Drawing Sheets

Further Display Logic

(56) References Cited

U.S. PATENT DOCUMENTS

| | | |
|---|---|---|
| 6,239,348 B1 | 5/2001 | Metcalf |
| 6,317,503 B1 | 11/2001 | Mercs et al. |
| 6,329,908 B1 | 12/2001 | Frecska |
| 6,611,678 B1 | 8/2003 | Zweig et al. |
| 6,741,708 B1 | 5/2004 | Nakatsugawa |
| 7,007,106 B1 | 2/2006 | Flood et al. |
| 7,146,011 B2 | 12/2006 | Yang et al. |
| 7,483,538 B2 | 1/2009 | McCarty et al. |
| 7,483,958 B1 | 1/2009 | Elabbady et al. |
| 7,492,913 B2 | 2/2009 | Connor et al. |
| 7,760,891 B2 | 7/2010 | Biegelsen |
| 7,801,315 B2 | 9/2010 | Watanabe et al. |
| 8,345,883 B2 | 1/2013 | Takumai et al. |
| 8,505,054 B1* | 8/2013 | Kirley ............... H04N 21/4307 725/74 |
| 8,605,921 B2 | 12/2013 | Hesdahl |
| 9,282,196 B1 | 3/2016 | Norris et al. |
| 9,288,597 B2 | 3/2016 | Carlsson et al. |
| 9,300,419 B2 | 3/2016 | Knowles |
| 9,323,335 B2 | 4/2016 | Williamson et al. |
| 9,369,801 B2 | 6/2016 | Carlsson et al. |
| 9,402,145 B2 | 7/2016 | Carlsson et al. |
| 9,426,551 B2 | 8/2016 | Carlsson et al. |
| 9,485,556 B1 | 11/2016 | List |
| 9,560,449 B2 | 1/2017 | Carlsson et al. |
| 9,693,168 B1 | 6/2017 | Carlsson et al. |
| 9,693,169 B1 | 6/2017 | Carlsson et al. |
| 9,699,579 B2 | 7/2017 | Carlsson et al. |
| 9,924,291 B2 | 3/2018 | Milne et al. |
| 2001/0055397 A1 | 12/2001 | Norris et al. |
| 2003/0099212 A1 | 5/2003 | Anjum et al. |
| 2003/0118198 A1 | 6/2003 | Croft et al. |
| 2004/0208324 A1 | 10/2004 | Cheung et al. |
| 2006/0126878 A1 | 6/2006 | Takumai et al. |
| 2006/0227980 A1 | 10/2006 | Barger |
| 2006/0253272 A1* | 11/2006 | Gao ................ G10L 13/00 704/2 |
| 2007/0011039 A1* | 1/2007 | Oddo ............... G06F 21/316 705/7.33 |
| 2007/0183618 A1 | 8/2007 | Ishii et al. |
| 2007/0211022 A1 | 9/2007 | Boillot |
| 2007/0226530 A1 | 9/2007 | Celinski et al. |
| 2007/0230736 A1 | 10/2007 | Boesen |
| 2007/0233293 A1 | 10/2007 | Villemoes et al. |
| 2008/0031470 A1 | 2/2008 | Angelhag |
| 2008/0089268 A1 | 4/2008 | Kinder et al. |
| 2008/0253575 A1 | 10/2008 | Lorgeoux et al. |
| 2009/0069081 A1 | 3/2009 | Thorner |
| 2009/0177462 A1* | 7/2009 | Alfven ............... G06F 40/58 704/3 |
| 2009/0228285 A1 | 9/2009 | Schnell et al. |
| 2009/0252338 A1 | 10/2009 | Koppens et al. |
| 2009/0264114 A1 | 10/2009 | Virolainen et al. |
| 2009/0298420 A1 | 12/2009 | Haartsen et al. |
| 2010/0057433 A1* | 3/2010 | Jackson ............ G06F 9/454 704/4 |
| 2010/0185434 A1* | 7/2010 | Burvall ............. G10L 15/005 704/3 |
| 2010/0272271 A1 | 10/2010 | Hayakawa et al. |
| 2010/0299639 A1 | 11/2010 | Ramsay et al. |
| 2010/0316237 A1 | 12/2010 | Elberbaum |
| 2011/0103592 A1 | 5/2011 | Kim et al. |
| 2012/0039477 A1 | 2/2012 | Schijers et al. |
| 2012/0058727 A1 | 3/2012 | Cook et al. |
| 2012/0070004 A1 | 3/2012 | LaBosco et al. |
| 2012/0087503 A1 | 4/2012 | Watson et al. |
| 2012/0120218 A1 | 5/2012 | Flaks et al. |
| 2012/0177225 A1 | 7/2012 | Springfield et al. |
| 2012/0207307 A1 | 8/2012 | Engdegard et al. |
| 2012/0274850 A1* | 11/2012 | Hawkins ............ H04N 5/04 348/515 |
| 2012/0314872 A1 | 12/2012 | Tan et al. |
| 2012/0316860 A1* | 12/2012 | Reitan .............. G06F 40/58 704/2 |
| 2013/0044051 A1* | 2/2013 | Jeong ............. H04N 21/44218 345/156 |
| 2013/0077803 A1 | 3/2013 | Konno et al. |
| 2013/0121515 A1 | 5/2013 | Hooley et al. |
| 2013/0144595 A1* | 6/2013 | Lord ................ G06F 40/58 704/2 |
| 2013/0223660 A1 | 8/2013 | Olafsson et al. |
| 2013/0272527 A1 | 10/2013 | Oomen et al. |
| 2013/0279888 A1 | 10/2013 | Zeng et al. |
| 2013/0304804 A1* | 11/2013 | Glasser ........... H04L 29/08522 709/203 |
| 2014/0118616 A1* | 5/2014 | Oughriss ........... H04N 21/8106 348/462 |
| 2014/0254811 A1 | 9/2014 | Takeda et al. |
| 2014/0254829 A1 | 9/2014 | Wang et al. |
| 2014/0270306 A1 | 9/2014 | Luna et al. |
| 2014/0278438 A1 | 9/2014 | Hart et al. |
| 2014/0287806 A1 | 9/2014 | Balachandreswaran |
| 2014/0297296 A1 | 10/2014 | Koppens et al. |
| 2014/0323036 A1 | 10/2014 | Daley et al. |
| 2014/0328485 A1 | 11/2014 | Saulters |
| 2014/0355765 A1 | 12/2014 | Kulavik et al. |
| 2015/0077859 A1 | 3/2015 | Kanetaka et al. |
| 2015/0078579 A1 | 3/2015 | Lopez |
| 2015/0078595 A1 | 3/2015 | Shintani et al. |
| 2015/0086035 A1 | 3/2015 | Shin |
| 2015/0104026 A1 | 4/2015 | Kappus et al. |
| 2015/0128194 A1 | 5/2015 | Kuang et al. |
| 2015/0139439 A1 | 5/2015 | Norris et al. |
| 2015/0154183 A1* | 6/2015 | Kristjansson ......... G10L 13/00 704/3 |
| 2015/0176890 A1 | 6/2015 | Spanos et al. |
| 2015/0192241 A1 | 7/2015 | Shannahan et al. |
| 2015/0195649 A1 | 7/2015 | Vogt |
| 2015/0199122 A1 | 7/2015 | Garmark et al. |
| 2015/0208184 A1 | 7/2015 | Tan et al. |
| 2015/0215722 A1 | 7/2015 | Milne et al. |
| 2015/0215723 A1 | 7/2015 | Carlsson et al. |
| 2015/0245157 A1 | 8/2015 | Seefeldt |
| 2015/0304789 A1 | 10/2015 | Babayoff et al. |
| 2015/0358768 A1 | 12/2015 | Luna et al. |
| 2015/0363389 A1* | 12/2015 | Zhang ............... G06F 40/58 704/2 |
| 2015/0373449 A1 | 12/2015 | Jackson |
| 2015/0382129 A1 | 12/2015 | Florencio et al. |
| 2016/0014536 A1 | 1/2016 | Sheen |
| 2016/0021454 A1 | 1/2016 | Liang et al. |
| 2016/0150314 A1 | 5/2016 | Nishidate |
| 2016/0157008 A1 | 6/2016 | Zhang et al. |
| 2016/0165337 A1 | 6/2016 | Trestain et al. |
| 2016/0171964 A1 | 6/2016 | Kim et al. |
| 2016/0174012 A1 | 6/2016 | Tan et al. |
| 2016/0195856 A1 | 7/2016 | Spero |
| 2016/0286330 A1 | 9/2016 | Kofman et al. |
| 2016/0286350 A1 | 9/2016 | Lin et al. |
| 2016/0350067 A1 | 12/2016 | Sundaresan et al. |
| 2016/0359512 A1 | 12/2016 | Fathollahi et al. |
| 2017/0019742 A1 | 1/2017 | Rappoport |
| 2017/0045941 A1 | 2/2017 | Tokubo et al. |
| 2017/0064457 A1 | 3/2017 | Kupershmidt et al. |
| 2017/0086008 A1 | 3/2017 | Robinson |
| 2017/0134888 A1* | 5/2017 | Innes ............... H04M 1/72412 |
| 2017/0164099 A1 | 6/2017 | Shintani et al. |
| 2017/0270140 A1* | 9/2017 | Lor ................. G06F 16/24578 |
| 2019/0371202 A1* | 12/2019 | Shintani ............ G10L 15/26 |
| 2020/0043481 A1* | 2/2020 | Xiong .............. G06F 40/263 |
| 2020/0194000 A1* | 6/2020 | Xian ............... G10L 15/005 |

OTHER PUBLICATIONS

"Ack Pro Mid-Sized Ball Bearing Brushless Gimbal with Turnigy 4008 Motors", Hobbyking.com, Retrieved from http://www.hobbyking/store/_51513_ACK_Pro_Mid_Sized_Ball_Bearing_Brushless_Gimbal_With_Turnigy_4008_Motors_NEX5_and_GF.html.

Elvira et al., "ALO4: Angle Localization and Orientation System with Four Receivers", Jun. 27, 2014, International Journal of Advanced Robotic Systems.

(56) References Cited

OTHER PUBLICATIONS

Gan et al., "Audio Projection: Directional Sound and Its Applications in Immersive Communication", 2011, IEE Signal Processing Magazine, 28(1), 43-57.

Lacks et al., "ALPS: A Bluetooth and Ultrasound Platform for Mapping and Localization", Dec. 4, 2015, Carnegie Mellon University.

Census 2000 PHC-T 42, Table 1a. America Speaks: A Demographic Profile of Foreign-Language Speakers for the United States: 2000.

\* cited by examiner

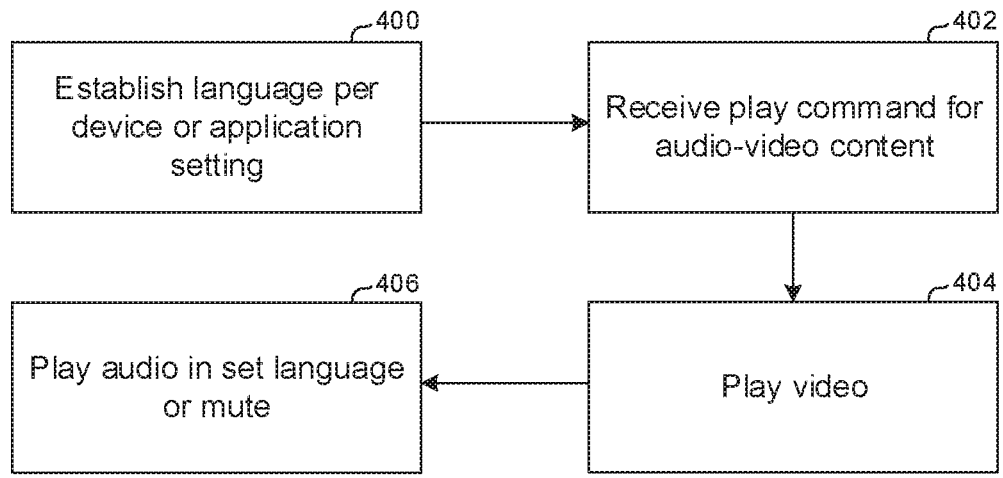
FIG. 4  Display Logic
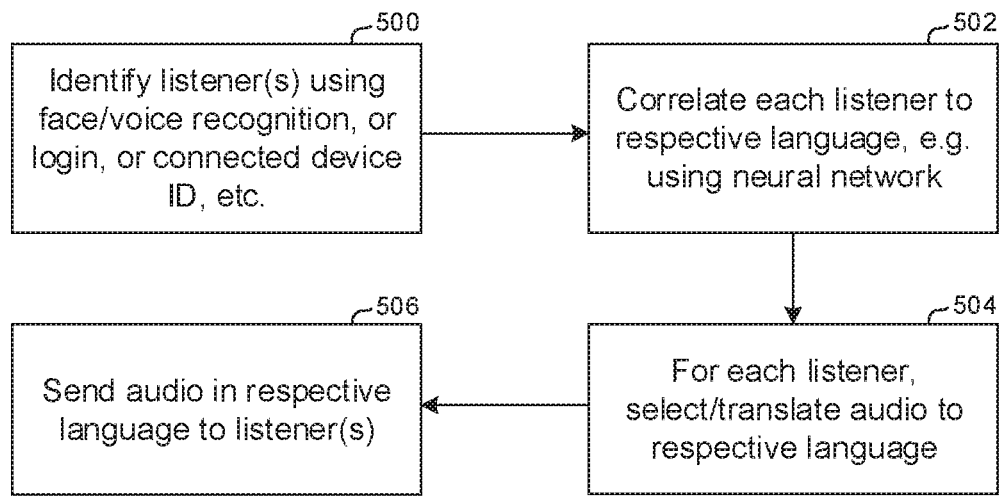
FIG. 5  Further Display Logic

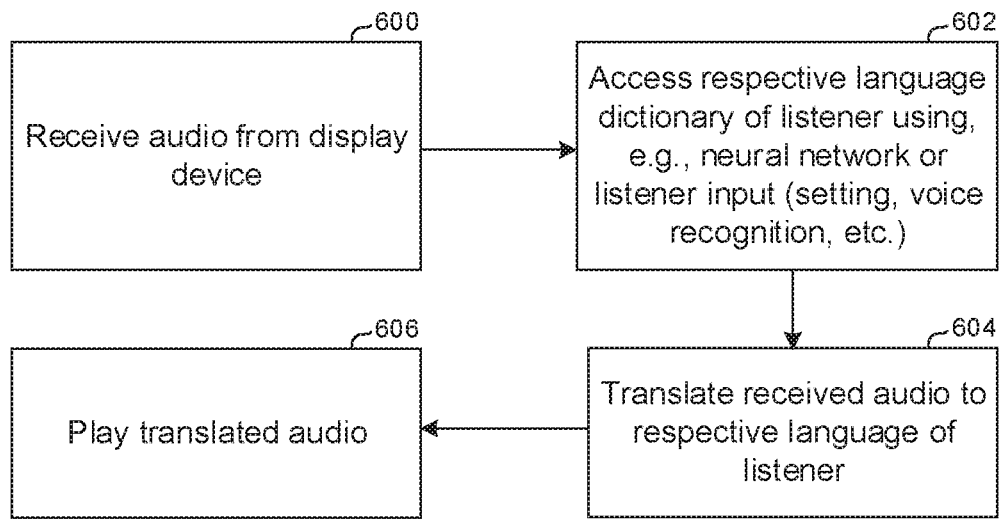
FIG. 6  Listener Device Logic (alternate embodiment)
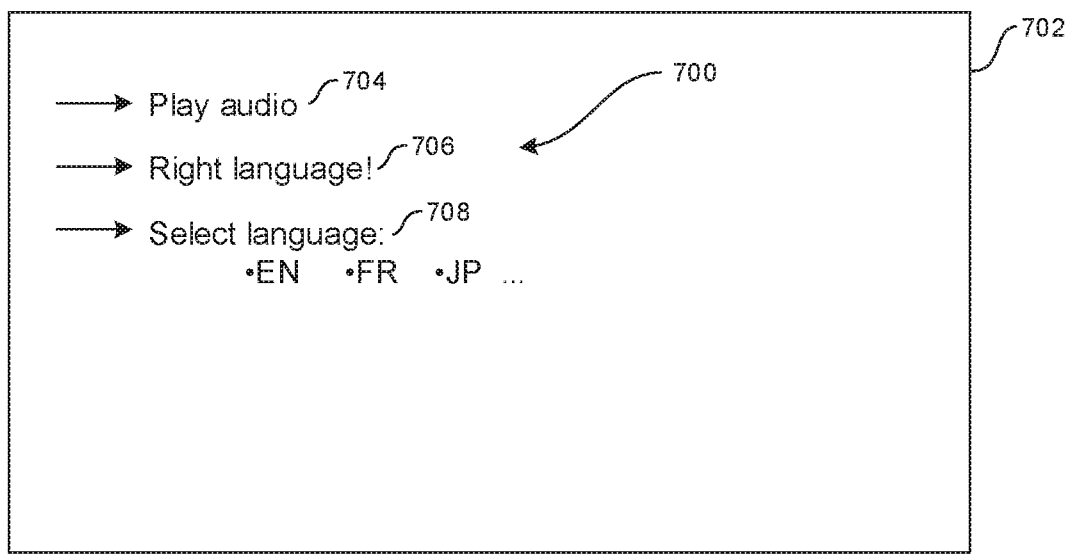
FIG. 7  Listener device

AUDIO VIDEO TRANSLATION INTO MULTIPLE LANGUAGES FOR RESPECTIVE LISTENERS

FIELD

The present application relates to technically inventive, non-routine solutions that are necessarily rooted in computer technology and that produce concrete technical improvements.

BACKGROUND

Audio-video (AV) content can be accompanied by audio in multiple languages. However, when an AV content is being played on a display device, the audio portion is typically played only using the language selected either in the device or in the application.

SUMMARY

Present principles recognize the desirability to allow plural listeners viewing a video to listen to audio in respective different languages to allow people of different cultures or languages to listen in their language of preference while viewing a commonly displayed video such as might be presented on a common display in an airplane or airport or hospital or movie theater, etc. to allow each viewer/listener his own personal experience.

An audio source such as a display device configured to present AV content can present the video and send the audio in different languages to the respective devices of different listeners. For example, a device/TV/source can send audio in different languages to connected headphones/smartglasses with speakers/devices/sink. Furthermore, machine learning may be employed both to recognize listeners and correlate them to likely languages and to mimic voices in the played-back audio. The source AV display device may send language in only the selected language of the display device to each listener device, with each receiving listener device converting the audio to the preferred language of the respective listener on the fly.

Accordingly, in one aspect an assembly includes at least one processor programmed to access instructions executable by the processor to receive at least audio in a first audio video (AV) content in a first language, and for at least a first recipient device, provide a second language version of the audio for play on at least one speaker of the first recipient device while video of the AV content is presented on a display device different from the first recipient device.

In some implementations, the processor is implemented in the display device, and the instructions are executable to translate the audio into the second language and send the audio in the second language to the first recipient device. The instructions may be further executable to translate the audio into the second language based at least in part on a demographic characteristic of a listener associated with the first recipient device. The characteristic can be identified by at least one neural network. Or, the instructions may be executable to translate the audio into the second language based at least in part on a near field communication of information from the first recipient device to the display device. In alternate embodiments the instructions can be executable to access the audio in the second language from an advanced television systems committee (ATSC) data stream. Moreover, the instructions can be executable to, for at least a second recipient device, provide a third language version of the audio for play on at least one speaker of the second recipient device while video of the AV content is presented on the display device, with the display device being different from the first and second recipient devices.

On the other hand, in some implementations the processor is implemented in the first recipient device, and the instructions can be executable to receive the audio in the first language and translate the audio to the second language on the fly as the video is presented on the display device.

In another aspect, a method includes inputting to at least one neural network (NN) a training set of data correlating human languages to test human characteristics to train the NN. The method includes subsequently inputting to the NN at least a first human characteristic, and in response to inputting to the NN the first human characteristic, receiving from the NN data in a human language. The method includes playing audio associated with the data on at least one recipient device, receiving input associated with the audio that is played, and providing the input to the NN to further train the NN.

The test human characteristics can include one or more of facial images, names, and locations.

In another aspect, a system includes at least a first display device configured to present video in an audio video (AV) stream and to present audio in the AV stream in a first language. The system also includes at least one processor configured to access the audio in second and third languages. The system still further includes at least a first recipient device configured to play the audio in the second language while the display device presents the video, and at least a second recipient device configured to play the audio in the third language while the display device presents the video.

In some examples the processor is implemented in the display device, and the display device is configured to send the audio in the second language to the first recipient device and send the audio in the third language to the second recipient device. The processor may be configured with instructions to translate the audio from the first language to the second language or to access the audio in the second language from an advanced television systems committee (ATSC) data stream. The processor may be configured with instructions to identify the second language at least in part based on information from at least one neural network and/or based on near field communication between the display device and the first recipient device.

In other embodiments the at least one processor includes at least a first processor in the first recipient device configured to access the audio in second language and at least a second processor in the second recipient device configured to access the audio in third language. The first and second processors can be configured with instructions to translate the audio from the first language to a different language.

The details of the present disclosure, both as to its structure and operation, can be best understood in reference to the accompanying drawings, in which like reference numerals refer to like parts, and in which:

BRIEF DESCRIPTION OF THE DRAWINGS

FIG. 4 is a flow chart of example logic that may be implemented by the video display device;

FIG. 5 is a flow chart of example logic that may be implemented by the video display device in a first embodiment;

FIG. 6 is a flow chart of example logic that may be implemented by a listener's audio device in a second embodiment; and FIG. 7 is a screen shot of an example user interface (UI) that may be presented to allow a listener to input feedback respecting the language being played by the listener's audio device.

DETAILED DESCRIPTION

Figure 1:
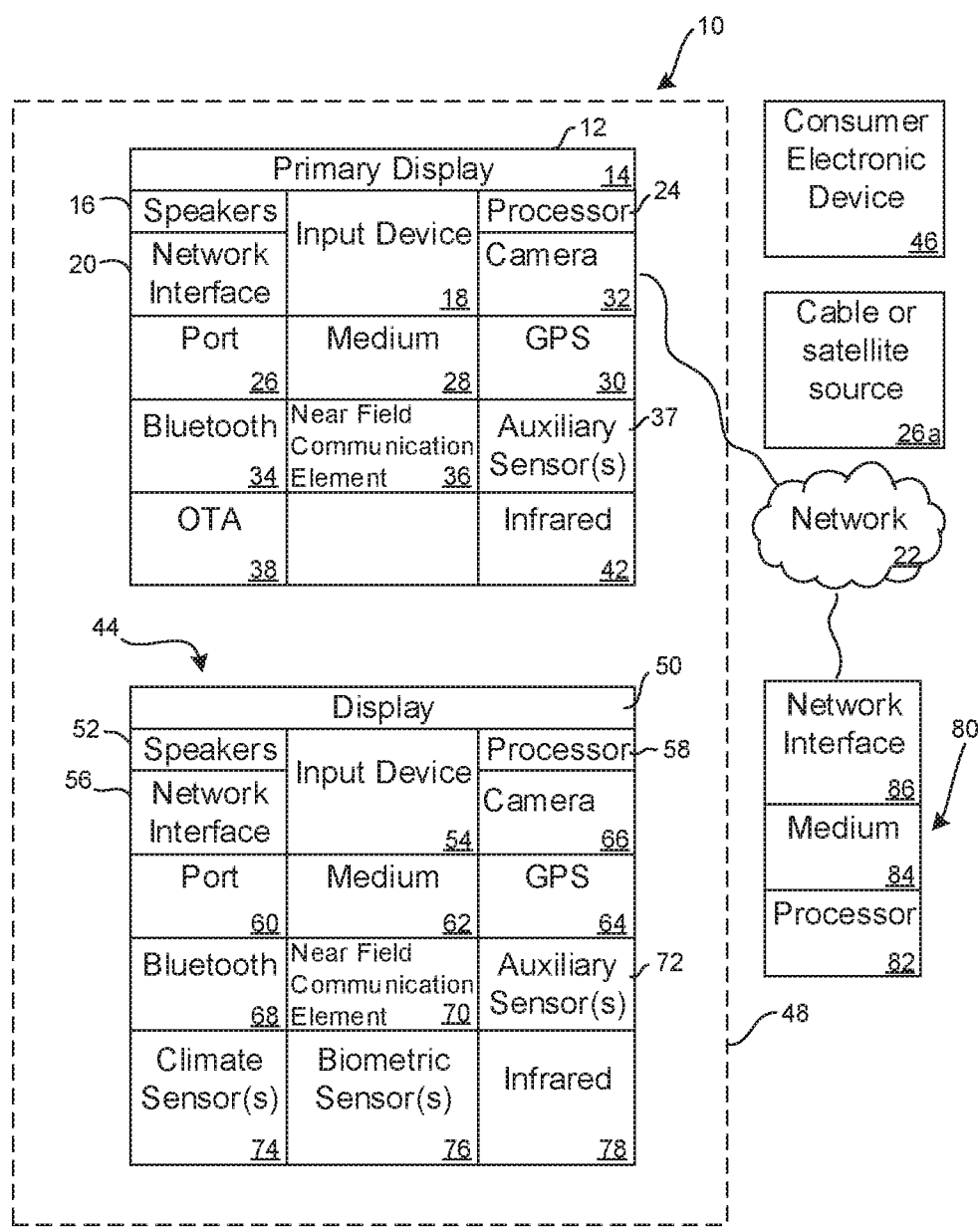
FIG. 1 is a block diagram of an example system including an example in consistent with present principles.

This disclosure relates generally to computer ecosystems including aspects of consumer electronics (CE) device-based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft or Unix or Apple, Inc. or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java®, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as, e.g., a computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as a keyboard or keypad or an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid-state storage (including but not limited to flash memory). Also, in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to send messages to a second CE device 46 may include similar components as the first CE device 44 and hence will not be discussed in detail. In the example shown, only two CE devices 44, 46 are shown, it being understood that fewer or greater devices may be used.

The example non-limiting first CE device 44 may be established by any one of the above-mentioned devices, for example, a portable wireless laptop computer or tablet computer or notebook computer or mobile telephone, and accordingly may have one or more of the components described below. The second CE device 46 without limitation may be established by a wireless telephone. The second CE device 46 may implement a portable hand-held remote control (RC).

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as a keypad or keyboard or audio receiver/microphone for entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 may control the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (for instance, using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (for sensing gesture command, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44.

At least one server 80 may include at least one server processor 82, at least one computer memory 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
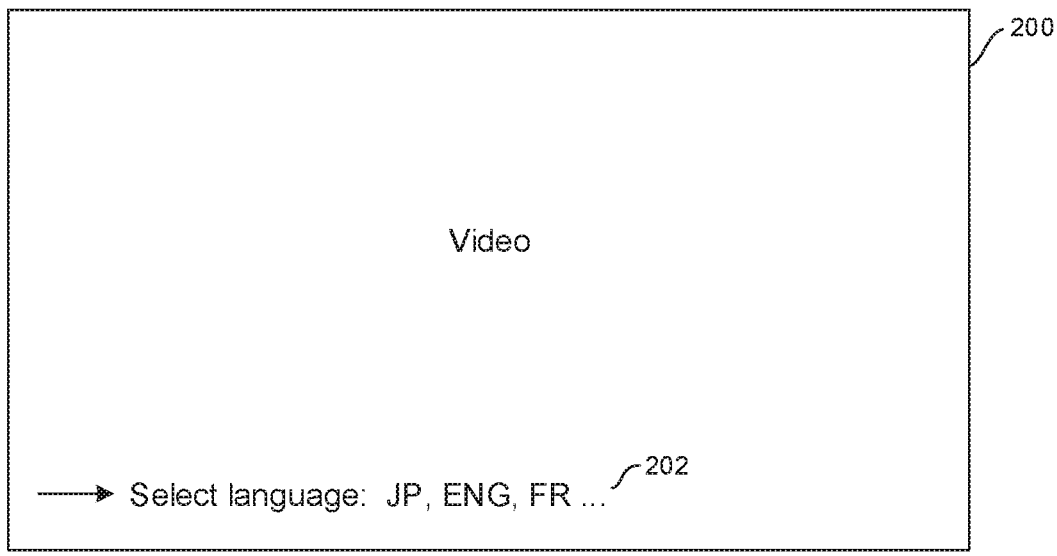
FIG. 2 is a block diagram illustrating plural listeners looking at one display while receiving audio for play in respective languages on individual audio devices.
Figure 2:
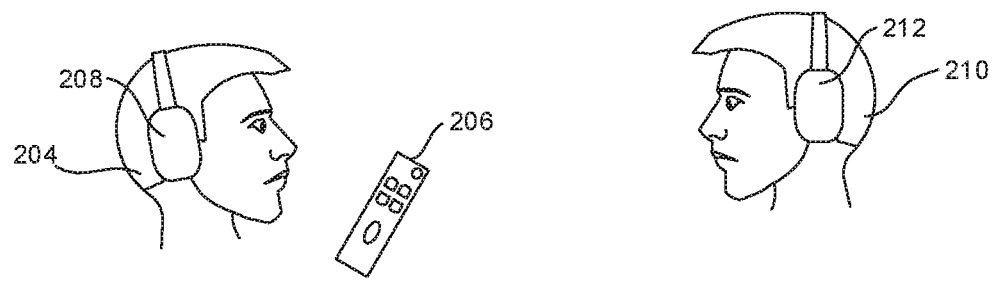

Now referring to FIG. 2, a display device 200 can present video and audio in an audio video (AV) stream. The display device 200, which can be implemented by the device 12 shown in FIG. 1, may present a selector 202 to enable selection of the language in which the audio is presented in the display device. A first person 204 may select the language using an input device 206 such as but not limited to a wireless remote control (RC). The first person 204 also may wear a recipient device 208 that includes any of the appropriate components of, for example, the CE device 44 shown in FIG. 1 including left and right ear buds or other configurations of audio speakers to play audio associated with the AV content being presented on the display device 200. However, the audio played on the recipient device 208 can be in a different language than the audio being played by the display device 200. Also, as further disclosed herein the selector 202 may be presented upon detection of near field communication (NFC) with the recipient device 208 or other prompting action, in which case selection of a language indicates the language desired to be played on the recipient device 208 according to principles herein.

A second person 210 may wear a recipient device 212 configured to play the audio associated with the AV content being presented on the display device 200 in a language different from those being played on the display device 200 and first recipient device 208.

Figure 3:
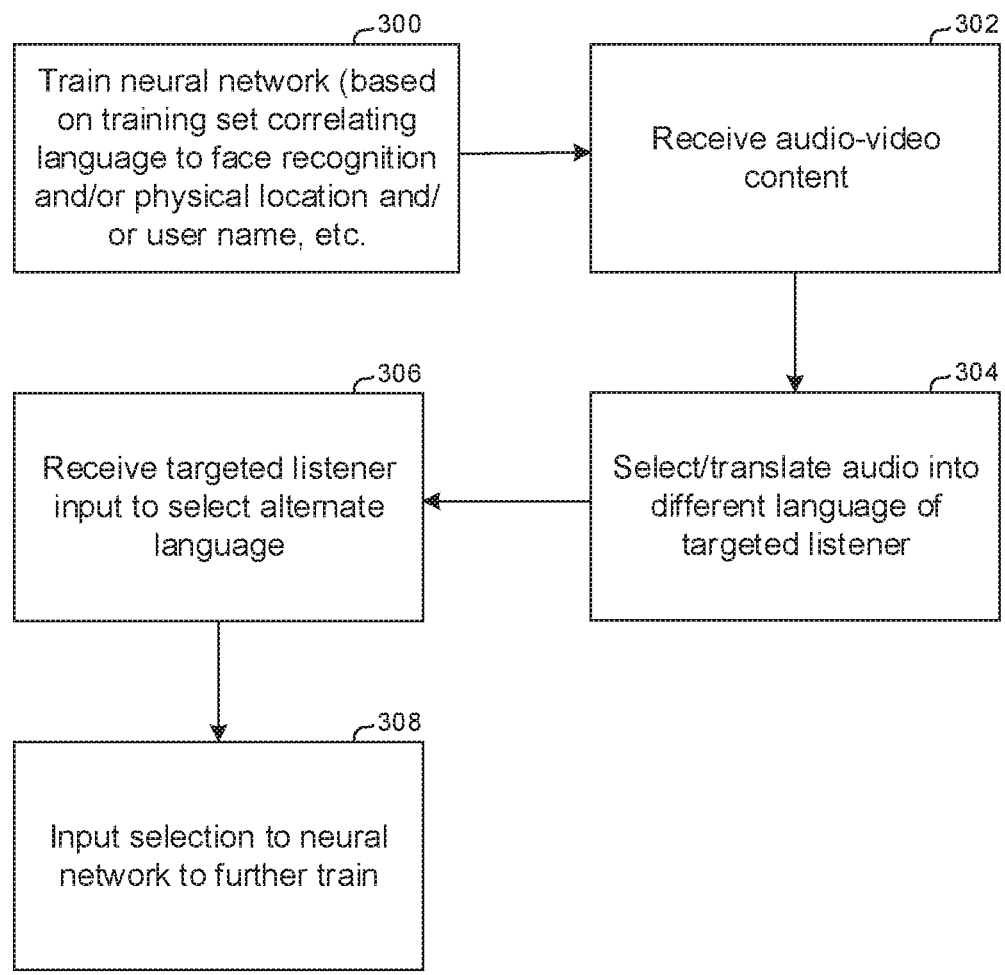
FIG. 3 is a flow chart of example logic of an embodiment that uses one or more neural networks to determine a language for a listener.

FIG. 3 illustrates an example in which one or more neural networks (NN) may be trained to determine the language in which the audio on the recipient devices is to be played, and also if desired to determine a particular voice in which audio is to be presented. Commencing at block 300, an input training set is provided to the NN which correlates languages and/or audio voice tonal characteristics to human characteristics such as face recognition, voice recognition, names, locations, or combinations thereof. For example, the training set may correlate "English" to a set of plural face images, and/or to a set of plural first names and/or last names, and/or to a set of locations. Likewise, the training set may correlate other languages such as French and Japanese to human characteristics. As but one example, a Japanese first and last name along with a location "U.S." may be correlated to the Japanese language on the assumption that a person in the U.S. with such a name combination likely speaks Japanese as a first language, whereas an Anglo first name along with a Japanese last name and a location "U.S." may be correlated to the English language on the assumption that a person in the U.S. with such a name combination likely speaks English as a first language. Not just language but a voice tone or other vocal characteristic with which to play narrated audio may be used to train the NN.

Once the NN is initially trained, the logic may proceed to block 302 to receive AV content. Moving to block 304, based on face recognition of a person (e.g., the person 204 in FIG. 2) or voice recognition or input of the person's name using the first recipient device 208 or location of the display device 200 as might be indicated by a GPS receiver, the language to present the audio in on the recipient device 208 is determined by the NN. As set forth further below this may be determined by the display device or the recipient device. In any case, the audio can be translated from the language set in the display device 200 to the different language determined at block 304 for presentation on the recipient device 308 on the fly as the video is presented on the display device 200. Or, the audio in the different language may already be present in an advanced television systems committee (ATSC) 3.0 broadcast or multicast and simply accessed from the ATSC 3.0 signal for presentation on the recipient device 208.

If desired, the logic may proceed to block 306 to receive input from the targeted listener 204 as to language selection correctness. For example, the listener 204 may select a language different from the one determined at block 304, indicating an incorrect determination, or may continue to listen to the audio in the language determined at block 304, indicating a correct determination. The user input is fed back to the NN at block 308 to further train the NN.

FIG. 4 illustrates logic that may be executed by the display device 200. Commencing at block 400, the language in audio is played on the display device 200 is established according to the device settings and/or an application executed on the display device 200. Moving to block 402, a play command is received to play AV content. The video is presented on the display device 200 at block 404, and the audio is played at block 406 on the display device 200 in the language established at block 400 or is muted.

FIG. 5 illustrates further display device logic in some embodiments in which the display device 200 determines the languages in which audio is to be presented on the recipient devices 208, 212. Commencing at block 500, the persons 204, 210 are identified using face recognition or voice recognition or through system login or by an ID of their recipient devices 208, 212, etc. For example, the person 204 may hold his device 208 close to the display device 200 to automatically communicate personal or device information to the display device 200 using NFC such as Bluetooth.

Moving to block 502, each person or listener identified at block 500 is correlating to a respective language. For example, if a person is detected by one or more microphones on the display device 200 speaking Spanish, the person may be correlated to the Spanish language for audio provisioning purposes. Or, based on device or login information, the person's preferred language may be looked up in a database. When a NN is employed, an image of the person's face, or voice, or location, or name may be input to the NN which returns a language to be associated with that person consistent with disclosure above.

Proceeding to block 504, based on the correlation at block 502 and for each listener 204, 210 the audio being presented on the display device 200, e.g., in a first language, is translated into respective second and third languages for the listeners 204, 210. Alternatively, assuming the display device 200 is presenting audio in a first language, the display device may access second and third tracks of that audio in the respective second and third languages as may be carried in an ATSC 3.0 content pipe. The audio in the respective languages is sent to the respective recipient devices 208, 2122 at block 506.

FIG. 6 illustrates an alternate technique in which each recipient device 208, 212 receives the audio in the first language from the display device 200 at block 600 and translates, on the fly, the audio into the respective different language at block 604 for play thereof at block 606. This may be facilitated by an intervening step at block 602 in which the recipient device may access a language dictionary in the language of the wearer of the recipient device as determined by a NN according to principles above or according to user input. The language dictionary is used to translate the audio. In this way, different people can use the same recipient device and hear the audio associated with the AV content being played on the display device 200 in their own respective languages when they are the person wearing, e.g., a shareable headset.

Instead of translating the audio the respective recipient device may access the audio in the referred different language from an ATSC 3.0 signal.

FIG. 7 illustrates a user interface (UI) 700 that may be presented on a display 702 that may be implemented by any display disclosed herein. The UI 700 includes a play selector 704 to cause a recipient device to play audio in the language selected consistent with disclosure above. A selector 706 may be presented and may be selectable to indicate that the language is correct. In addition, or alternatively a selector 708 may be presented and may be selectable to change the language currently set in the recipient device to a different language, indicating that the initial selection of the respective language was incorrect for feedback to, e.g., the NN.

While particular techniques are herein shown and described in detail, it is to be understood that the subject matter which is encompassed by the present application is limited only by the claims.

What is claimed is:

1. An assembly, comprising:
   at least one processor programmed to access instructions executable by the processor to:
   receive at least audio in a first audio video (AV) content, the audio being in a first language;
   for at least a first recipient device, provide a second language version of the audio for play on at least one speaker of the first recipient device while video of the AV content is presented on a display device different from the first recipient device, wherein the instructions are executable to translate the audio into the second language based at least in part on information output by at least one neural network executing face recognition of at least one input image.

2. The assembly of claim 1, wherein the at least one processor is implemented in the display device, and the instructions are executable to translate the audio into the second language and send the audio in the second language to the first recipient device.

3. The assembly of claim 1, wherein the second language is identified by at least one neural network.

4. The assembly of claim 1, wherein the at least one processor is implemented in the display device, and the instructions are executable to access the audio in the second language from an advanced television systems committee (ATSC) data stream.

5. The assembly of claim 1, wherein the at least one processor is implemented in the display device, and the instructions are executable to, for at least a second recipient device, provide a third language version of the audio for play on at least one speaker of the second recipient device while video of the AV content is presented on the display device, the display device being different from the first and second recipient devices.

6. The assembly of claim 1, wherein the at least one processor is implemented in the first recipient device, and the instructions are executable to receive the audio in the first language and translate the audio to the second language as the video is presented on the display device.

7. A system comprising:
   at least a first display device configured to present video in an audio video (AV) stream and to present audio in the AV stream in a first language;
   at least one processor configured to access the audio in at least a second language;
   at least a first recipient device configured to play the audio in the second language while the display device presents the video; and
   wherein the at least one processor is configured with instructions to identify the second language at least in part based on face recognition executed by at least one neural network.

8. The system of claim 7, wherein the at least one processor is implemented in the display device, and the display device is configured to send the audio in the second language to the first recipient device and send the audio in a third language to a second recipient device.

9. The system of claim 7, wherein the at least one processor is configured with instructions to translate the audio from the first language to the second language.

10. The system of claim 7, wherein the at least one processor is configured with instructions to access the audio in the second language from an advanced television systems committee (ATSC) data stream.

11. The system of claim 7, wherein the at least one processor comprises at least a first processor in the first recipient device configured to access the audio in second language and at least a second processor in a second recipient device configured to access the audio in a third language.

12. The system of claim 11, wherein the first and second processors are configured with instructions to translate the audio from the first language to a different language.

\* \* \* \* \*